(12) United States Patent
Yamamoto

(10) Patent No.: US 12,046,042 B2
(45) Date of Patent: Jul. 23, 2024

(54) IMAGE OBTAINING MEANS FOR TRACKING AN OBJECT

(71) Applicant: TOYOTA MOTOR EUROPE, Brussels (BE)

(72) Inventor: Kazuya Yamamoto, Brussels (BE)

(73) Assignee: TOYOTA MOTOR EUROPE, Brussels (BE)

( * ) Notice: Subject to any disclaimer, the term of this patent is extended or adjusted under 35 U.S.C. 154(b) by 374 days.

(21) Appl. No.: 17/608,702

(22) PCT Filed: May 3, 2019

(86) PCT No.: PCT/EP2019/061447
§ 371 (c)(1),
(2) Date: Nov. 3, 2021

(87) PCT Pub. No.: WO2020/224750
PCT Pub. Date: Nov. 12, 2020

(65) Prior Publication Data
US 2022/0230439 A1    Jul. 21, 2022

(51) Int. Cl.
*G06K 9/00* (2022.01)
*G06V 20/52* (2022.01)
(Continued)

(52) U.S. Cl.
CPC .............. *G06V 20/52* (2022.01); *G06V 40/20* (2022.01); *G08B 13/1963* (2013.01);
(Continued)

(58) Field of Classification Search
CPC .... G06V 20/52; G06V 40/20; G08B 13/1963; H04N 7/185; H04N 7/188; H04N 23/611; H04N 23/695
See application file for complete search history.

(56) References Cited

U.S. PATENT DOCUMENTS 6,437,819 B1    8/2002 Loveland
2010/0013917 A1*  1/2010 Hanna .............. G08B 13/19689
                                            348/E13.001
(Continued)

FOREIGN PATENT DOCUMENTS

DE    69515265 T2    9/2000
JP    H11341474 A   12/1999

OTHER PUBLICATIONS

Nov. 2, 2021 International Preliminary Report on Patentability issued in International Patent Application No. PCT/EP2019/061447.
(Continued)

*Primary Examiner* — Xin Jia
(74) *Attorney, Agent, or Firm* — Oliff PLC

(57) ABSTRACT

An image obtaining means including: a processor; a memory module communicatively coupled to the processor; a camera communicatively coupled to the processor; and the processor being configured to: receive, from the camera, image data; determine whether a predetermined object is present based on the image data; if a predetermined object is detected as present, determine if the predetermined object is moving or stationary; and if the predetermined object is stationary for at least a predetermined time period, record the duration that the predetermined object is stationary in the memory module.

9 Claims, 3 Drawing Sheets

(51) Int. Cl.
*G06V 40/20* (2022.01)
*G08B 13/196* (2006.01)
*H04N 7/18* (2006.01)
*H04N 23/611* (2023.01)
*H04N 23/695* (2023.01)

(52) U.S. Cl.
CPC .............. *H04N 7/185* (2013.01); *H04N 7/188* (2013.01); *H04N 23/611* (2023.01); *H04N 23/695* (2023.01)

(56) References Cited

U.S. PATENT DOCUMENTS

| | | |
|---|---|---|
| 2013/0135468 A1 | 5/2013 | Kim et al. |
| 2016/0142680 A1* | 5/2016 | Tsunematsu ........... H04N 23/69 348/159 |
| 2017/0161961 A1* | 6/2017 | Salsberg ................ H04N 7/183 |

OTHER PUBLICATIONS

Jan. 23, 2020 Search Report issued in International Patent Application No. PCT/EP2019/061447.

* cited by examiner

[Fig. 1]
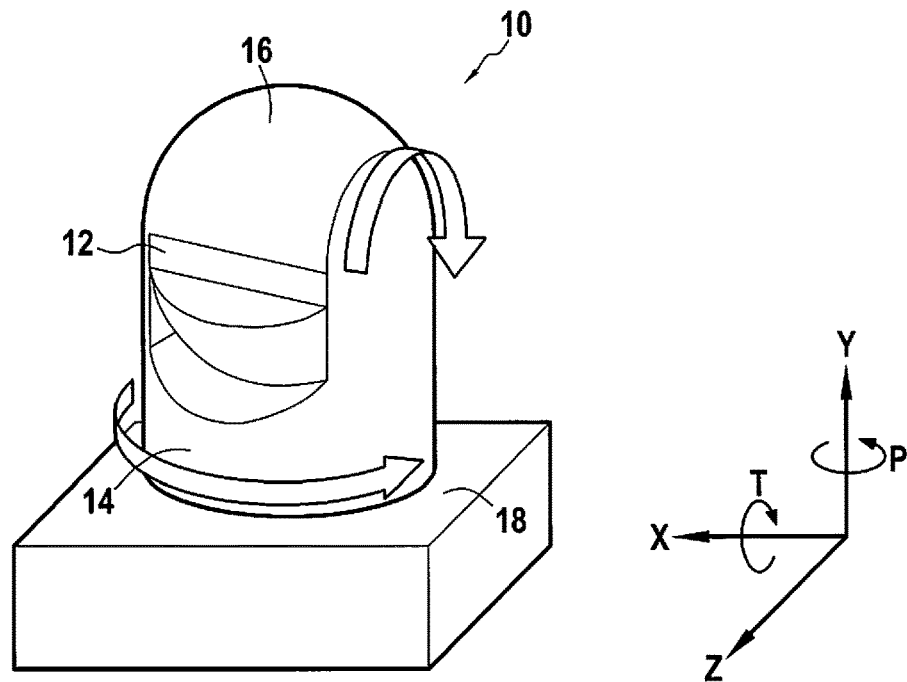
[Fig. 2]
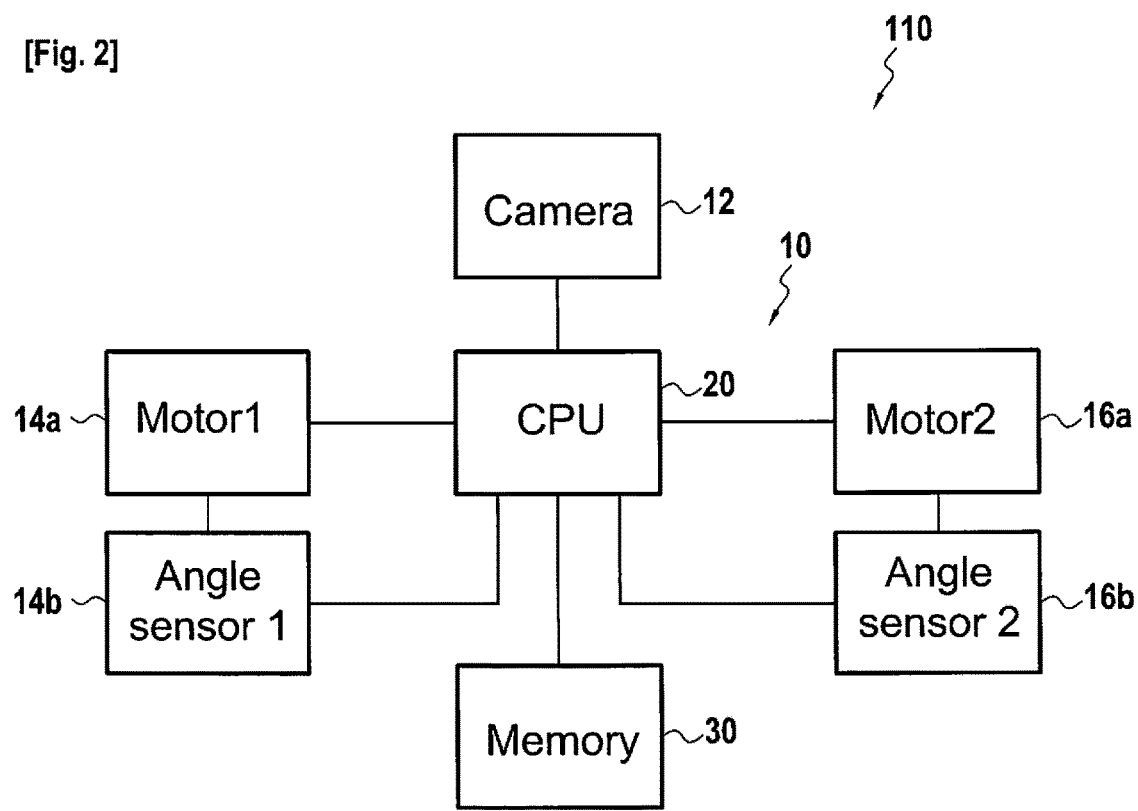

[Fig. 3]
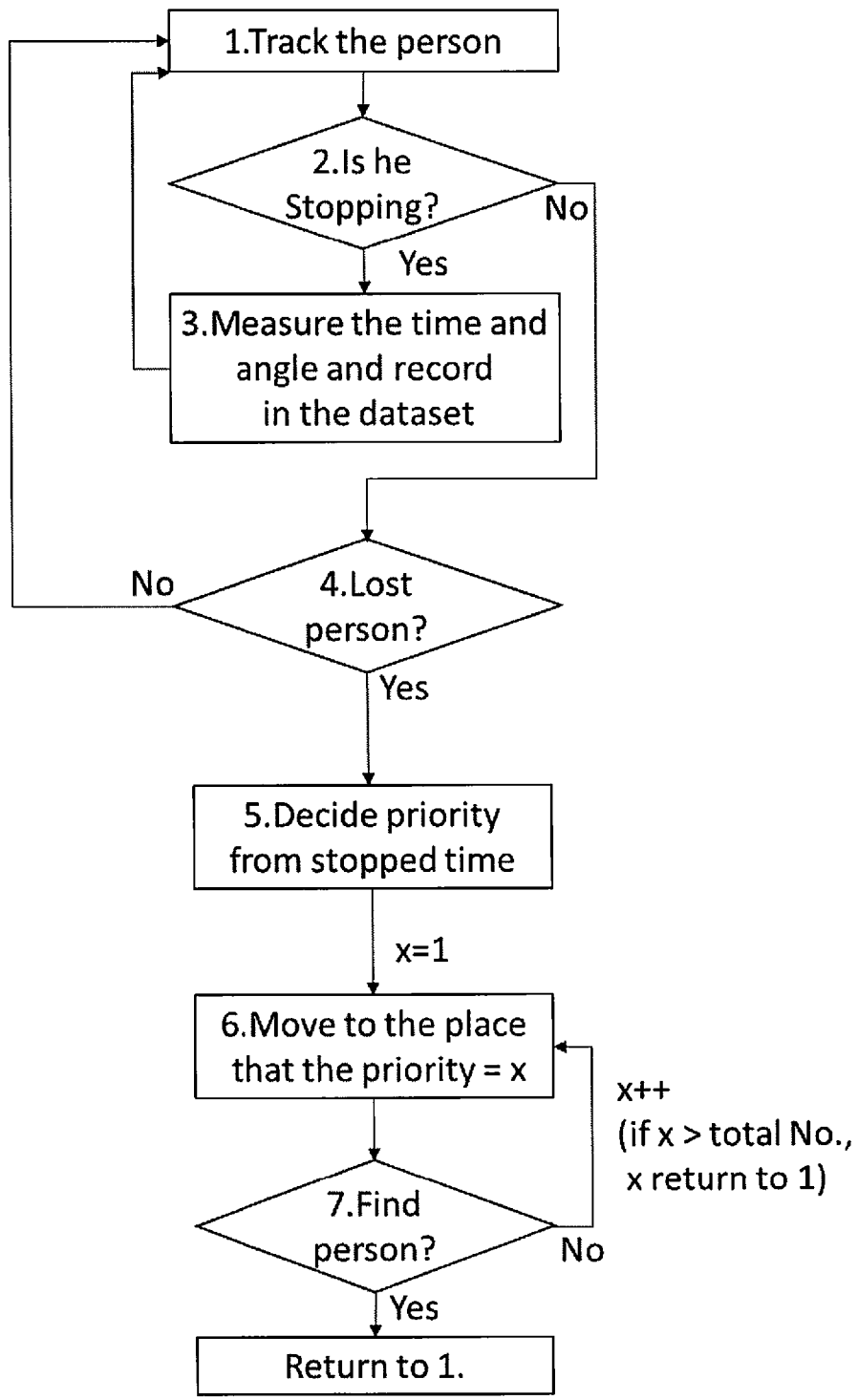

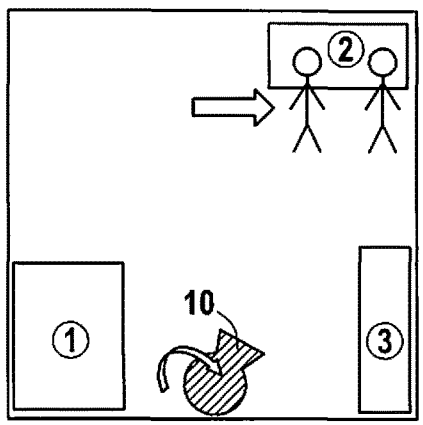
[Fig. 4A]
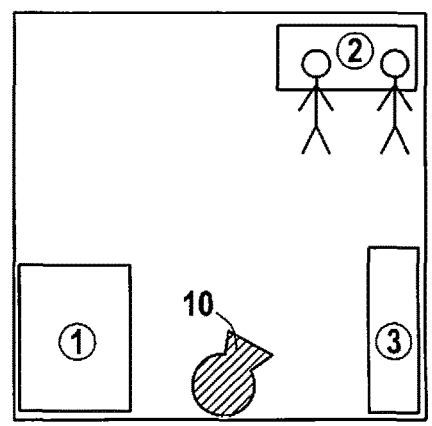
[Fig. 4B]
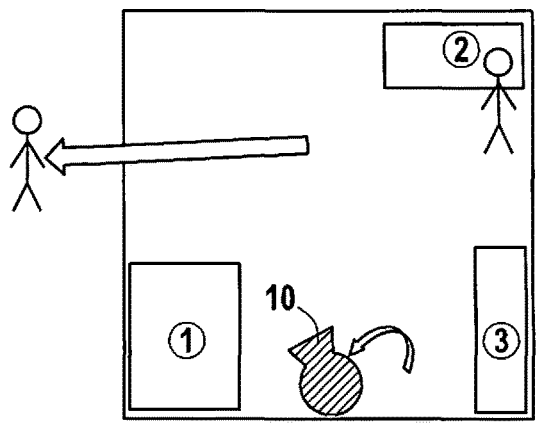
[Fig. 4C]
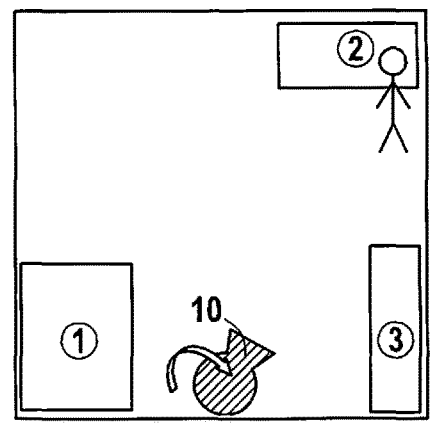
[Fig. 4D]
[Fig. 5]
Sample of dataset
| No. | Pan angle $\alpha$ | Tilt angle $\theta$ | Stopped time (min) | Priority |
|---|---|---|---|---|
| ① | 170 | 40 | 223 | 2 |
| ② | -15 | -15 | 260 | 1 |
| ③ | -180 | 35 | 115 | 3 |
Table 1

IMAGE OBTAINING MEANS FOR TRACKING AN OBJECT

FIELD OF THE DISCLOSURE

The present disclosure relates to a camera enabled device for tracking an object. More particularly, the present disclosure relates to a camera enabled device for tracking one or multiple individuals by learning the habits of the individual(s).

BACKGROUND OF THE DISCLOSURE

Monitoring systems that are adapted to track an individual have been available in recent years. These systems enable an operator to select a target individual and instruct a monitoring system to conduct autonomous monitoring of that individual.

According to some implementations, a system of cameras for autonomous monitoring may be implemented to track an individual of interest in a defined space. The system of cameras may be configured to "hand off" monitoring the target individual to ensure continuous monitoring of the individual until they leave the defined space. For example, U.S. Pat. No. 6,437,819 B1 discloses an automated video person tracking system.

SUMMARY OF THE DISCLOSURE

The inventors have recognized that there is a need for an improved automated tracking means and system. Therefore, an image obtaining means is provided. Said image obtaining means comprises a processor; a memory module communicatively coupled to the processor; a camera communicatively coupled to the processor; and the processor being configured to: receive, from the camera, image data; determine whether a predetermined object is present based on the image data; if a predetermined object is detected as present, determine if the predetermined object is moving or stationary; and if the predetermined object is stationary for at least a predetermined time period, record the duration that the predetermined object is stationary in the memory module.

Embodiments of the present disclosure may enable tracking of an object of interest or predetermined object and learning the common places of the object. Learning the common places of the object facilitates the image obtaining means' ability to find the object of interest quickly if the image obtaining means loses track of the object of interest. Additionally, this image obtaining means can quickly find a second object of interest if the first object of interest is lost or is no longer an object of interest.

An object of interest may include, but is not limited to, an animal or robotic entity. For example, the imaging obtaining means may learn the habits of a human by recording each location where the human is stationary. The places where a human may be stationary may include, for example, a dining table, sofa, kitchen, or bed. Stationary in the context of this application means the object is substantially still which may include the actions of speaking or adjusting position.

The camera may be a pan-tilt camera including angle sensors communicatively coupled to the processor for sensing the coordinates of the camera, the camera being configured to track the moving predetermined object.

The image obtaining means may be configured to record the coordinates of the camera oriented toward the predetermined object in the memory module if the image obtaining means determines that the predetermined object is stationary.

The image obtaining means may be configured to aggregate a list including the recorded coordinates of the camera and the duration the predetermined object was stationary in the recorded coordinates of the camera.

The image obtaining means may be configured to prioritize the list based on the duration the predetermined object was stationary.

The image obtaining means may be configured to sequentially set the pan-tilt camera through the prioritized list of coordinates until a predetermined object is detected if a predetermined object is not detected by the image obtaining means.

The image obtaining means may be configured to continuously update the list.

The image obtaining means may be configured to track the predetermined object using the pan-tilt camera if the predetermined object is moving.

The image obtaining means may be configured to search for the predetermined object at the coordinates where the predetermined object has been stationary if the moving predetermined object is lost during tracking.

The predetermined object may be searched based on the prioritized list.

The camera of the image obtaining means may be a RGB camera.

The camera of the image obtaining means may be an IR camera.

A tracking system comprising a plurality of image obtaining means is provided.

It is intended that combinations of the above-described elements and those within the specification may be made, except where otherwise contradictory.

It is to be understood that both the foregoing general description and the following detailed description are exemplary and explanatory only and are not restrictive of the disclosure, as claimed.

The accompanying drawings, which are incorporated in and constitute a part of this specification, illustrate embodiments of the disclosure and together with the description, serve to explain the principles thereof.

BRIEF DESCRIPTION OF THE DRAWINGS

FIG. 1 shows the exterior of an exemplary image obtaining means according to embodiments of the present disclosure;

FIG. 2 is an illustration of a processing system of the exemplary image obtaining means;

FIG. 3 is a flowchart showing an exemplary method according to embodiments of the present disclosure;

FIGS. 4A-4D are pictorials showing the operation of the exemplary image obtaining means; and FIG. 5 is a table showing an example of a dataset accumulated by the exemplary image obtaining means.

DESCRIPTION OF THE EMBODIMENTS

Reference will now be made in detail to exemplary embodiments of the disclosure, examples of which are illustrated in the accompanying drawings. Wherever possible, the same reference numbers will be used throughout the drawings to refer to the same or like parts.

FIG. 1 shows an exterior of an exemplary image obtaining means 10 according to embodiments of the present disclosure. The image obtaining means 10 may include a camera 12. The camera 12 may be any suitable camera, for example a color camera or infrared camera. The image obtaining means 10 may be configured to pan, tilt, and zoom (PTZ) the camera 12, in particular a first rotatable portion 14 may be configured to rotate about a Y axis (pan) and a second rotatable portion 16 may be configured to rotate about a X axis (tilt) that is orthogonal to the Y axis. The image obtaining means 10 may include a base 18 that is configured to mount to a surface.

Shown in FIG. 2 is an illustration of a processing system of the exemplary image obtaining means. The image obtaining means 10 may include motors 14a, 16a to control the pan and tilt of the rotatable portions 14, 16, one or more angle sensors 14b, 16b, a processing means 20, such as a central processing unit (CPU), and memory 30, among others.

The image obtaining means 10 may be configured to process the data obtained from a defined space or predetermined area to aid in the execution of tracking an object of interest. Such image obtaining means 10 are known in the art, and one of skill in the art will understand that any such image obtaining means 10 may be implemented in the present image obtaining means without departing from the scope of the present disclosure.

CPU 20 may be configured to manipulate data, perform calculations, and execute code, in order to carry out embodiments of the present disclosure. For example, determine that the predetermined objet is stationary, moving, lost, aggregate a list, prioritize a list, execute a search protocol, etc. CPU 20 may be linked to one or more databases and/or other memory (e.g., RAM, ROM, etc.) associated with the image obtaining means 10 so as to enable storage of data related to the object of interest. One of skill in the art will recognize that information discussed herein with regard to any such databases and/or memory is not intended to be limiting.

CPU 20 may be configured to receive data from one or more angle sensors 14a, 14b. For example, CPU 20 may receive data regarding a status and/or position of the first and second motors 14, 16, among others.

The image obtaining means 10 may include one or more system controllers, which may be configured to receive information and/or commands from CPU 20, and to execute those commands to control the image obtaining means 10. For example, the controller(s) may position the first and second motors 14 and 16 to coordinates that are associated with a determined "meaningful place" such that the camera 12 can find an object of interest.

The flowchart of FIG. 3 showing an exemplary method according to embodiments of the present disclosure will be discussed along with the pictorials in FIGS. 4A-4D that demonstrate how the image obtaining means 10 operates.

Step 1

According to embodiments of the disclosure, after the image obtaining means 10 finds an object of interest it is configured to track the object. This is shown in FIG. 4A.

Step 2

Next, the image obtaining means 10 determines whether the object is stopped, e.g. stationary. This is shown in FIG. 4B.

Step 3

If it is determined that the object is stopped, for example, more than 3 seconds, the image obtaining means 10 initiates a timer that records the amount of time that the object is stopped in a particular location. Additionally, image obtaining means 10 records the coordinates of the first and second motors read from the first and second angle sensors. This data is recorded and continually updated in the in the memory of the image obtaining means 10. If the object begins moving again, the image obtaining means terminates the timer and records the total amount of time the object of interest was stopped.

Once this value is recorded in the memory, the CPU determines what priority the recorded data set should have in a list of "meaningful places." The CPU may, for example, prioritize the recorded coordinates based on the total amount of time that the object of interest is stopped or stationary. The total amount of time is to be construed as the total aggregate time. For example, day 1 a person spends 50 minutes on their sofa at first and second motor coordinates X1,Y1. Day 2 the person spends 60 minutes on their sofa at first and second motor coordinates X1, Y1. The aggregated amount for coordinates X1, Y1 is 110 minutes. As shown in FIGS. 4A-4D, locations ①, ②, ③ are each recorded as "meaningful places" or coordinates where the object of interest, which is depicted as a person, has stopped.

Step 4

If it is determined that the person is not stopped, then the CPU determines, based on the data processed by the image obtaining means 10, whether the object of interest is within field of view. If the object of interest is within view, then the method returns to step 1. If the object is not detected within the field of view or "lost", then the CPU executes a search protocol. This is depicted in FIG. 4C.

Step 5

To execute the search protocol, the CPU aggregates a list of the recorded time spent as it relates to the first and second motor coordinates of the image obtaining means 10. An example of this list is shown in FIG. 5. The listed coordinates and associated aggregated times are assembled into a table and prescribed a priority. The priority of a set of coordinates is determined based on the aggregated time, i.e., the priority is set based on location where the object of interest spends the most time. In the example shown in FIG. 5, the person spends the most time at location ②, and thus location ② is assigned the highest priority.

Step 6

The search protocol may use the aggregated list with assigned priorities to search for the object of interest by orienting the image obtaining means 10 to the top priority coordinates to find an object of interest. However, it is also contemplated that the image obtaining means 10 may search of the object of interest by sequentially orientating the image obtaining means 10, e.g., the pan-tilt camera, through the prioritized list of coordinates.

Step 7

For each set of coordinates that the image obtaining means 10 moves to, the image obtaining means determines whether an object of interest is found. For example, returning to table 1 shown in FIG. 5, location ② has been assigned with the top priority. Therefore, the image obtaining means 10 moves to the associated coordinates and then determines if an object of interest is detected within the field of view of the camera 12. This situation is depicted in FIG. 4D.

An object of interest may be an assigned particular object, for example, an individual whose facial features are recorded in a facial recognition database. As such, the image obtaining means 10 may search for an individual. However, it is also envisioned that the object of interest may simply be any classification, for example, humans, dogs, robots, etc. Thus, as depicted in FIG. 4D, the image obtaining means 10 has determined that the second person in location ② is an object of interest, and the image obtaining means 10 may return to step 1. However, if the object of interest is not found, the image obtaining means 10 may proceed to the second, third, fourth, etc. prioritized coordinates in the aggregated list of meaningful places until it is determined that an object of interest is detected.

Although the present disclose has been discussed with reference to the image obtaining means 10, it is contemplated that several image obtaining means 10 may be configured to operate together as a tracking system or network. The tracking system may be linked together wirelessly.

Throughout the description, including the claims, the term "comprising a" should be understood as being synonymous with "comprising at least one" unless otherwise stated. In addition, any range set forth in the description, including the claims should be understood as including its end value(s) unless otherwise stated. Specific values for described elements should be understood to be within accepted manufacturing or industry tolerances known to one of skill in the art, and any use of the terms "substantially" and/or "approximately" and/or "generally" should be understood to mean falling within such accepted tolerances.

Where any standards of national, international, or other standards body are referenced (e.g., ISO, etc.), such references are intended to refer to the standard as defined by the national or international standards body as of the priority date of the present specification. Any subsequent substantive changes to such standards are not intended to modify the scope and/or definitions of the present disclosure and/or claims.

Although the present disclosure herein has been described with reference to particular embodiments, it is to be understood that these embodiments are merely illustrative of the principles and applications of the present disclosure.

It is intended that the specification and examples be considered as exemplary only, with a true scope of the disclosure being indicated by the following claims.

The invention claimed is:

1. An image obtaining means comprising:
    a processor;
    a memory module communicatively coupled to the processor;
    a camera communicatively coupled to the processor; and
    the processor being configured to:
        receive, from the camera, image data;
        determine whether a predetermined object is present based on the image data;
        if a predetermined object is detected as present, determine if the predetermined object is moving or stationary; and
        if the predetermined object is stationary for at least a predetermined time period, record the duration that the predetermined object is stationary in the memory module;
    wherein the camera is a pan-tilt camera including angle sensors communicatively coupled to the processor for sensing the coordinates of the camera, the camera being configured to track the moving predetermined object;
    wherein the image obtaining means is configured to record the coordinates of the camera oriented toward the predetermined object in the memory module if the predetermined object is stationary;
    wherein the image obtaining means is configured to aggregate a list including the recorded coordinates of the camera and the duration the predetermined object was stationary in the recorded coordinates of the camera; and
    wherein the image obtaining means is configured to prioritize the list based on the duration the predetermined object was stationary.

2. The image obtaining means of claim 1, wherein the image obtaining means is configured to sequentially set the pan-tilt camera through the prioritized list of coordinates until a predetermined object is detected if a predetermined object is not detected.

3. The image obtaining means of claim 1, wherein the image obtaining means is configured to continuously update the list.

4. The image obtaining means of claim 1, wherein the image obtaining means is configured to track the predetermined object using the pan-tilt camera if the predetermined object is moving.

5. The image obtaining means of claim 4, wherein the image obtaining means is configured to search for the object at coordinates where the predetermined object has been stationary, if the moving predetermined object is lost during tracking.

6. The image obtaining means of claim 5, wherein the object is searched based on the prioritized list.

7. The image obtaining means of claim 1, wherein the camera is a RGB camera.

8. The image obtaining means of claim 1, wherein the camera is an IR camera.

9. A tracking system comprising a plurality of image obtaining means according to claim 1.

* * * * *